United States Patent Office 2,703,466
Patented Mar. 8, 1955

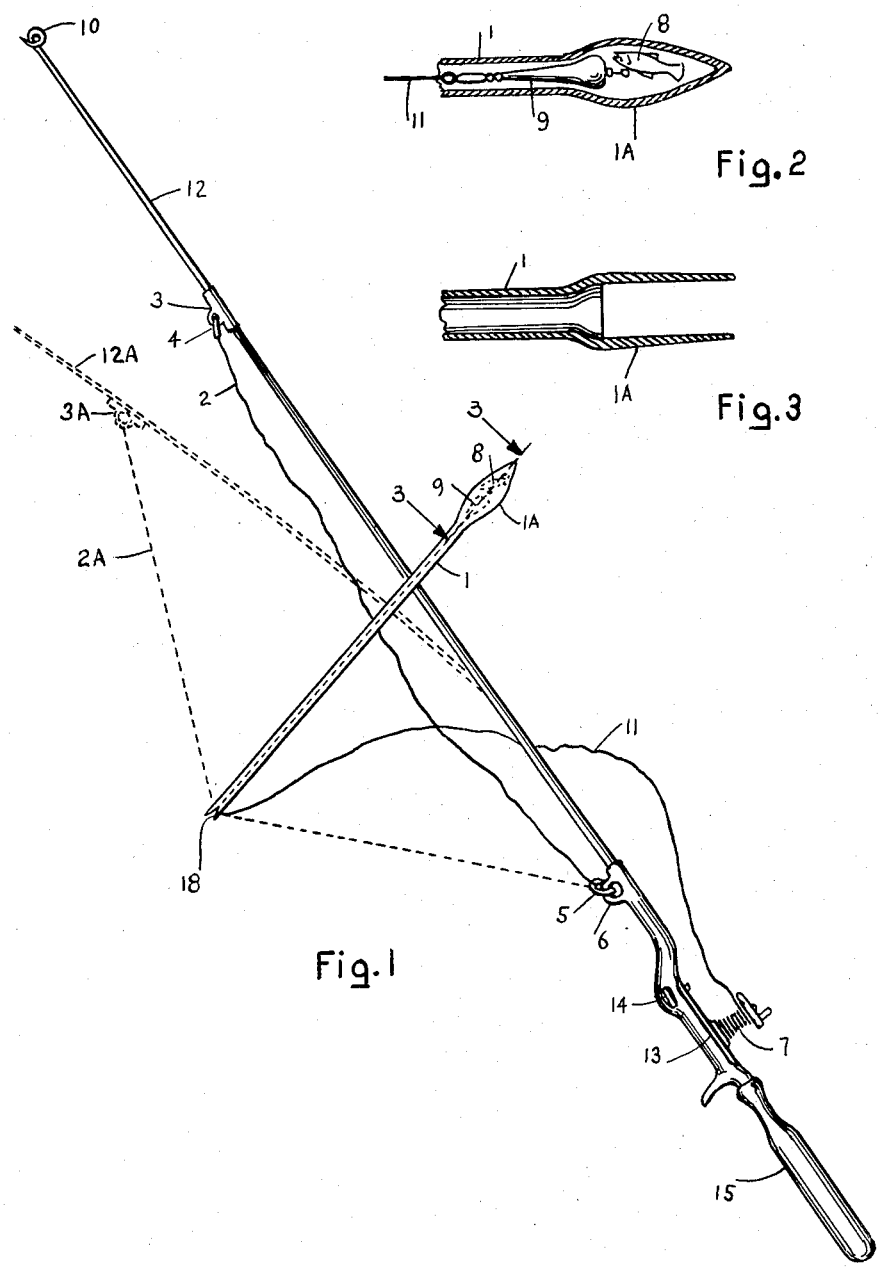

2,703,466

COMBINATION FISHING POLE

Peter Badovinac, Cleveland, Ohio

Application October 4, 1950, Serial No. 188,359

1 Claim. (Cl. 43—19)

My invention relates to new design and useful improvements in devices for fishing.

One of the objects and purposes of the invention is to provide a device in the form of a fishing pole or casting rod, by which the flexure in such rod or pole is used as a means for casting a line with bait and sinker by means of an arrow-like element.

Another object and purpose of the invention is the provision of a device as described in which the arrow-like element provides a safety means for the like, sinker and bait when cast into the water.

A further object and purpose of the invention is the combination of an arrow-like element with a fishing rod or pole, a reel and a line to provide a convenient and safe device for casting without the lashing of such pole or rod as is necessary in casting in general.

The foregoing stated objects and others to be attained in the use of the device will be readily disclosed by a reading of the description in conjunction with the accompanying drawings, in which:

Fig. 1 is a perspective view of the complete invention;

Fig. 2 is a view of one of the end portions of the arrow in section; and

Fig. 3 is a sectional view through the arrow-like head taken on line 3—3 of Fig. 1.

Describing the invention from the drawing:

The numeral 1 refers to an arrow-like element having a hollow shaft with the upper end notched at 18 to receive a line or cord and the opposite end enlarged and terminating in two portions 1A which taper to a point. A cord 2 is attached to the rod or pole 12 by means of the fixtures 3 and 6 and the connections 4 and 5. The cord 2 is then placed in the notched end of the arrow-like element and such element pulled away from the pole in such a manner that the pole assumes the dotted position shown by 12A, the pole 12 is thus flexed similar to a bow and provides a means for shooting or casting the arrow when the pull on the arrow and line is released. A weight or sinker 9 is mounted on the line 11 and reference numeral 8 refers to "a catch" or fish which is also connected to the line and the line 11 is attached to a reel 7 positioned on the pole or rod between the handle or grip part 15 and the reel seat portions 13 and 14. An open eye 10 is formed at the end of the rod to receive the line 11 after the cast has been made by means of the arrow-like element 1, which may be made of a light weight substance such as cork so that it will remain upright and near the surface when cast in the water if desired, thus holding the hook, bait and sinker at a desired depth in the water.

In the use and operation of the device, a fishing pole or rod provided with attachments as shown in Fig. 1 including an ordinary reel 7 upon which a line may be wound is used, a line such as 11 is inserted through the arrow-like element and attached to the reel 7, the opposite end of the line being provided with a sinker 9 and a hook and bait which are disposed within the space between the two end portions 1A, the shape and size of the sinker being such as to prevent the sinker, the hook and the bait, from being pulled up through the reduced hollow part of the shaft 1 when such arrow element is cast.

When ready to cast, in place of lashing the pole through the air as is done in ordinary casting, the string 2 is placed in the notched end 18 of the arrow element, said notched end is then drawn away from the pole, causing the pole to flex similar to a bow and then by releasing the pull on the notched end of the arrow element, such element, carrying the sinker, hook and bait is projected the distance desired, the line 11 unreeling from 7 as the cast is made. The arrow element being of lighter than water material, such as cork, will hold the sinker with the hook and bait in an upright position in the water and as near the surface as desired. After the cast is made and the required length of line unwound from the reel 7, the line 11 is passed through the open eye 10 on the end of the pole or rod in such a manner as to prevent further unwinding from the reel. The hook and bait, being supported between the two portions 1A, are protected in many ways as compared with a hook and bait with sinker as ordinarily cast into the water. The device can also be conveniently used for casting where trees or other obstructions prevent ordinary pole or rod casting and also avoids the danger of the hook catching in clothing of persons nearby, or in other obstructions.

While I have shown and described my invention in a desired and efficient form and structure, adaptations in use may necessitate changes or modifications in form or arrangement of structure or both without departing from the basic features or spirit of the invention.

What I claim and desire to secure by Letters Patent is:

A fishing device of the character described comprising a flexible fishing or casting rod having a handle portion at one end thereof, a reel mounted on said rod adjacent said handle portion, a pair of eyelets mounted on said rod intermediate the ends thereof in a spaced relation, a length of cord extending between said spaced apart eyelets on said pole and affixed at either end to said eyelets, an object in the representation of an arrow having a hollow shaft and a notch formed in one end of said shaft and a hollow head formed on the opposite end thereof, a fishing line disposed around and secured to said reel and having a hook and a lure and sinker affixed on the outer and free end of such line, said hollow head portion being adapted to removably enclose said hook and lure and sinker, said rod and said cord constituting means for projecting said arrow to strike the surface of a body of water for releasing said hook and lure and sinker from within the head, and said object constituting means for supporting said hook and lure and sinker at a desired depth within the water.

References Cited in the file of this patent

UNITED STATES PATENTS

| Number | Name | Date |
|---|---|---|
| 736,051 | Adams | Aug. 11, 1903 |
| 1,457,983 | Malone | June 5, 1923 |
| 1,810,779 | Milam | June 16, 1931 |
| 2,089,744 | Golden | Aug. 10, 1937 |
| 2,260,705 | Eguchi | Oct. 28, 1941 |
| 2,292,743 | Cordry | Aug. 11, 1942 |
| 2,305,176 | Littman | Dec. 15, 1942 |
| 2,531,418 | Fitzharris | Nov. 28, 1950 |
| 2,570,782 | Evatt | Oct. 9, 1951 |